United States Patent Office 3,470,209
Patented Sept. 30, 1969

3,470,209
TETRAHYDROPYRANS AND -FURANS
Hans Dietmar Lamparsky, Dubendorf, and Roman Marbet, Riehen, Switzerland, assignors to Givaudan Corporation, Delawanna, N.J., a corporation of New Jersey
No Drawing. Filed Dec. 7, 1965, Ser. No. 512,216
Claims priority, application Switzerland, Dec. 11, 1964, 15,996/64
Int. Cl. C07d 7/02, 5/16
U.S. Cl. 260—345.8
35 Claims

ABSTRACT OF THE DISCLOSURE

Processes and intermediates for novel ketones useful in perfumery on account of their desirable olfactory properties are disclosed. The ketones have the formula:

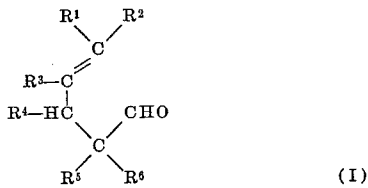

wherein A represents a member selected from the group consisting of

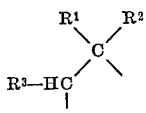

and

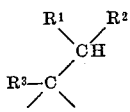

wherein $R^1$ represents a lower alkyl group which may be substituted by a free, esterified or etherified hydroxy group; a lower alkenyl, a member selected from the group consisting of phenyl, benzyl and phenethyl, or, together with $R^2$, a lower alkylene group; $R^2$ is a lower alkyl group; $R^3$, $R^4$ and $R^5$ represent hydrogen atoms or lower alkyl groups; $R^6$ represents a hydrogen atom or a lower alkyl or alkenyl group; $R^7$ represents a hydrogen atom or a lower alkyl group which may be substituted by a free, esterified or etherified hydroxy group; and $R^8$ represents a lower alkyl group which may be substituted by a free, esterified or etherified hydroxy group; a lower alkenyl or phenyl.

The present invention relates to novel ketones and to a process for the manufacture thereof, which process is characterized in that a γ,δ-unsaturated aldehyde of the general formula

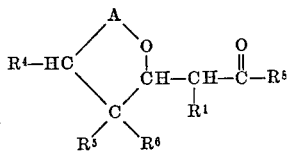

wherein $R^1$ represents a lower alkyl group which may be substituted by a free, esterified or etherified hydroxy group; a lower alkenyl, an aralkyl or aryl group, or together with $R^2$, a lower alkylene group; $R^2$ is a lower alkyl group, $R^3$, $R^4$ and $R^5$ represent hydrogen atoms or lower alkyl groups; and $R^6$ represents a hydrogen atom or a lower alkyl or alkenyl group, is reacted with a ketone of the general formula

wherein $R^7$ represents a hydrogen atom or a lower alkyl group which may be substituted by a free, estrified or etherified hydroxy group; and $R^8$ represents a lower alkyl group which may be substituted by a free, esterified or etherified hydroxy group; a lower alkenyl or an aryl group, in the presence of an alkaline condensation agent, whereupon the resulting hydroxy-ketone of the general formula

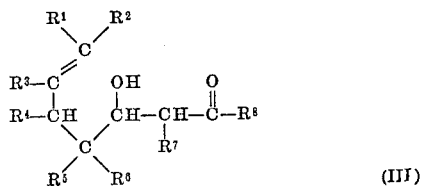

wherein $R^1$–$R^8$ have the above meaning, is cyclised in the presence of an acid cyclisation agent.

Examples of lower alkyl groups represented by the symbols $R^1$–$R^8$ are alkyl groups having 1–6 carbon atoms such as methyl, ethyl, propyl, isopropyl, butyl, isobutyl, pentyl.

Examples of lower alkenyl groups represented by the symbols $R^1$, $R^6$ and $R^8$ are alkenyl groups having up to 6 carbon atoms such as allyl, 2-methyl-1-propenyl, 4-methyl-3-pentenyl, 2,3-dimethyl-2-butenyl.

Examples of lower alkylene groups represented by $R^1$ together with $R^2$ are tetramethylene and pentamethylene.

Examples of esterified and etherified hydroxy groups which can be present in $R^1$, $R^7$ and $R^8$ substituents are: acyloxy groups the acyl residue of which is derived from a lower aliphatic or aromatic carboxylic acid having 1–7 carbon atoms such as formic acid, acetic acid, propionic acid, butyric acid, benzoic acid; lower alkoxy groups having 1–7 carbon atoms such as methoxy, ethoxy, propoxy, isopropoxy, or aryloxy groups such as phenoxy. Examples of alkyl groups carrying free, esterified hydroxy groups are thus: hydroxy-methyl, acetoxy-ethyl, methoxypropyl, 4-hydroxy(or methoxy or acetoxy)-4- methylpentyl.

The phenyl group may be named as an example of an aryl group which may be present as the $R^1$- or $R^8$-group, and the benzyl or phenethyl group as an aralkyl group ($R^1$).

As the alkaline condensation agent for the reaction of the aldehyde of Formula I with the ketone of Formula II there can be used, for example, alkali alcoholates such as sodium methylate and sodium ethylate. These alcoholates can be added to the reaction mixture in solid form, e.g. as powder, or in the form of solutions. Thus, for example, a solution of sodium ethylate in ethanol can be used. As condensation agents there can be further mentioned: alkali metal or alkaline earth metal hydroxides and carbonates such as, for example, sodium, potassium or barium hydroxide, conveniently in absolute alcoholic solution such as a solution in absolute methanol, ethanol or isopropanol.

The condensation reaction can be carried out with or without the addition of a solvent. When using, for example, acetone, methyl-ethyl-ketone or mesityl oxide as the ketone component, the addition of a special solvent is superfluous.

Otherwise hydrocarbons such as benzene or toluene can be used as solvents.

The temperature of the condensation reaction can vary within wide limits. When using, for example, acetone as the ketone component, the preferred temperature range is −15° to +15° C. The condensation reaction can, however, also be carried out at reflux temperature; for example, if methyl ethyl ketone is employed as the ketone component.

For the cyclisation of the hydroxy-ketones [ketols] of general Formula III, which are obtained by the condensation reaction, the following acid cyclisation agents, for example, are suitable: mineral acids such as sulphuric acid, hydrohalic acids, for example, hydrochloric acid or hydrobromic acid; phosphoric acid; strong organic acids such as paratoluene-sulphonic acid. As solvents for the cyclisation reaction, hydrocarbons, such as benzene, toluene, high-boiling petroleum ether, are, for example, suitable. The cyclisation is preferably carried out at elevated temperatures; for example, at temperatures above 50° C., conveniently at the reflux temperature of the reaction mixture, particularly in the range of about 70–110° C.

The products of cyclisation have the general formula

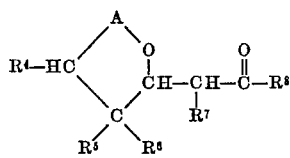

wherein A is a member selected from the group consisting of

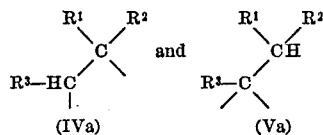

Depending on the nature of the starting materials used, various diastereomeric tetrahydropyran compounds of the formula

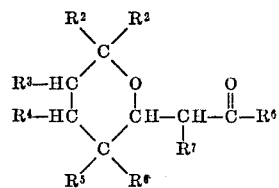

or the isomeric tetrahydrofuran compounds of the formula

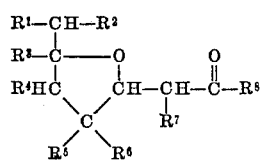

or mixtures of compounds of Formulae IV and V result from the ring closure.

In those cases where $R^3$ in the compounds of Formulae I and III represents hydrogen, the end products are predominantly tetrahydropyrans of Formula IV. If, however, $R^3$ in the compounds of Formulae I and III represents a lower alkyl group, tetrahydrofurans of Formula V are obtained predominantly, the resulting reaction mixture containing also tetrahydropyrans of Formula IV. The mixtures of diastereomers as well as the mixtures of tetrahydrofurans and tetrahydropyrans may be resolved by the usual methods such as, for example, fractional distillation or chromatography.

The aldehydes of general Formula I which are used as starting materials in the present process can be obtained by reacting a secondary or tertiary allyl alcohol of the general formula

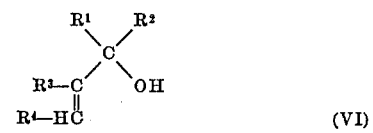

wherein $R^1$–$R^4$ have the above significance, with an enol ether of the general formula

or an acetal of the general formula

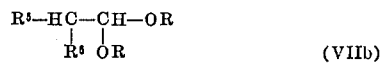

in which formulae the symbols $R^5$ and $R^6$ have the above significance and R represents a lower alkyl group, in the presence of an acid catalyst (such as a mineral acid, for example, sulphuric acid; but especially phosphoric acid; or a strong organic acid such as oxalic acid, trichloro-acetic acid, paratoluene-sulphonic acid) and if desired with the application of elevated pressure.

The tetrahydropyran compounds of Formula IV and the isomeric tetrahydrofuran compounds of Formula V which are obtainable according to the process of the present invention are characterized by particular odour-notes. As a rule, rose-like, iris-like and wood-notes are prevalent. The products of Formulae IV and V as well as mixtures thereof can thus be used as odorants for the manufacture of perfumed products.

EXAMPLE 1

56.0 g. of 5-methyl-4-hexen-1-al and 290 g. of acetone are mixed and the resulting mixture is treated dropwise with stirring at 15 to 20° C. with a sodium ethylate solution freshly prepared from 0.6 g. of sodium and 10 ml. of absolute ethanol. After complete addition, the reaction mixture is stirred for a further 2 hours at 15° C., then neutralised with glacial acetic acid, whereupon the excess of acetone is distilled off on the water-bath. The residue is taken up in 200 ml. of ether, the ethereal solution is washed with water and dried. The residue (90 g.), which remains after evaporation of the solvent, is distilled in vacuum, the fractions which pass over at 87–90° C. being collected. Yield: 34.2 g. of 4-hydroxy-8-methyl-7-nonen-2-one, boiling point 56–58° C./0.01 mm.; $n_D^{20}$=1.4670; bands of the I.R.-spectrum: 3448, 1718, 1165, 1092 cm.$^{-1}$.

57.0 g. of distilled 4-hydroxy-8-methyl-7-nonen-2-one are boiled at reflux with stirring for 4 hours with 5.7 g. of concentrated phosphoric acid in 150 ml. of benzene. After cooling, the reaction solution is poured on ice, the organic phase is decanted, the aqueous phase is extracted with toluene, the combined organic solution is washed neutral with water, dried and freed from solvent in vacuum. The residue (53 g.) is subjected to fractional distillation. There are obtained 37 g. of 2-acetonyl-6,6-dimethyl-tetrahydropyran, purification of which yields a uniform product of boiling point 43–44° C./1 mm.; $n_D^{20}$=1.4455. The I.R.-spectrum shows strong bands at 1715, 1374, 1357, 1096 and 1072 cm.$^{-1}$. (Fruit-like fragrance with camphor-like note.)

EXAMPLE 2

126 g. of 2,5-dimethyl-4-hexen-1-al are dissolved in 580 g. of acetone. A total of 2.7 g. of sodium methylate is added in small portions with stirring at 10 to 15° C. to this solution. Stirring is continued for 2½ hours at 15–18° C. The solution is subsequently neutralised with glacial acetic acid and worked up as in Example 1. Yield: 102.5 g. of 4-hydroxy-5,8-dimethyl-7-nonen-2-one of boiling point 70–72° C./0.03 mm.; $n_D^{20}$=1.4685.

132 g. of this ketol are boiled at reflux for 4 hours with 13.2 g. of crystallized phosphoric acid in 400 ml. of benzene. After working up as in Example 1 there are obtained 87 g. of 2-acetonyl-3,6,6-trimethyl-tetrahydropyran in the form of an isomer mixture. Careful fractionation on the spinning-band column results in concentration (up to 94% purity) of the diastereomer of boiling point 53–54° C./1 mm. which had been formed as the main product; $n_D^{20}=1.4457$. The I.R.-spectra of this and the second-most important isomer show the characteristic absorption bands at 1718, 1089 and 1056 cm.$^{-1}$. The product has a green note which is reminiscent of roses.

EXAMPLE 3

70 g. of 2,4,5-trimethyl-4-hexen-1-al in 290 g. of acetone are treated in the course of 20 minutes, with stirring at 14 to 18° C. with 1.35 g. of sodium methylate and subsequently stirred for a further 2 hours at the same temperature. Working up as in Example 1 yields 55.7 g. of 4-hydroxy-5,7,8-trimethyl-7-nonen-2-one of boiling point 71–72° C./0.06 mm.; $n_D^{20}=1.4769–1.4779$.

59.4 g. of distilled 4-hydroxy-5,7,8-trimethyl-7-nonen-2-one are heated at reflux for 4 hours with 5.9 g. of 85% phosphoric acid and 150 ml. of benzene. The working up is effected as in the foregoing examples. There is obtained an isomeric mixture (39.5 g.), fractionation of which yields the isomer of boiling point 61–62° C./1 mm., $n_D^{20}=1.4448$, as the main product.

The NMR spectrum (signal at 1.08 p.p.m.) and the mass spectrum (m/e=155 and m/e=43) indicate that this product is 2-acetonyl-3,5-dimethyl-5-isopropyl-tetrahydrofuran. This compound has a pleasant spicy odour reminiscent of bay and eucalyptus.

Besides the above tetrahydrofuran compound, a substance of melting point 83–85° C./3 mm. can be isolated from the reaction mixture by usual separation methods (distillation or chromatography), the NMR spectrum (signal at 1.16 p.p.m.) and the mass spectrum (no signal at m/e=155) of which substance indicate that said substance is 2-acetonyl-3,5,6,6-tetramethyl-tetrahydropyran.

EXAMPLE 4

70 g. of 2,2,5-trimethyl-4-hexen-1-al are dissolved in 290 g. of acetone and the solution is cooled to 0° C. 1.35 g. of sodium methylate are then introduced portionwise into this solution in the course of 20 minutes with cooling with an ice/salt mixture and stirring. The mixture is subsequently stirred for a further 4 hours at temperatures between 0 and −4° C. and then worked up. There are obtained around 96 g. of a product rich in 4-hydroxy-5,5,8-trimethyl-7-nonen-2-one (absorption bands of the I.R.-spectrum at 3378, 1712 and 1160 cm.$^{-1}$) which product is cyclised, without distillative purification, to 2-acetonyl-3,3,6,6-tetramethyl-tetrahydropyran with 9.7 g. of 95% phosphoric acid in 300 ml. of benzene by boiling at reflux for 4 hours. Working up as in the foregoing examples gives, after a single distillation, around 21 g. of a product from which there is obtained after rectification 2-acetonyl-3,3,6,6-tetramethyl-tetrahydropyran as a crystalline substance of melting point 43–44° C. (boiling point 78–80° C./1.5 mm.). The odour of this compound is flowery-fresh.

EXAMPLE 5

4-hydroxy-8-methyl-5-pentyl-7-nonen-2-one is obtained from 54.6 g. of 2-pentyl-5-methyl-4-hexen-1-al and 174 g. of acetone, by addition of 0.85 g. of sodium methylate at temperatures between −6 and −12° C., stirring for 3 hours and the usual working up (in which the excess acetone is sucked off in the vacuum of the water-jet pump); yield of crude 4-hydroxy-8-methyl-5-pentyl-7-nonen-2-one: 67 g.

After the addition of 6.7 g. of concentrated phosphoric acid and 225 ml. of benzene, this ketol is cyclised to 2-acetonyl-3-pentyl-6,6-dimethyl - tetrahydropyran (crude yield 24 g.). Rectification in the spinning-band column yields a mixture of the two possible diastereomers of boiling point 117–118° C./1.5 mm.; $n_D^{20}=1.4556–1.4558$. The product has an earthy, mushroomlike odour.

EXAMPLE 6

63 g. of 2,5-dimethyl-4-hexen-1-al are heated to 70° C. together with 180 g. of methyl-ethyl-ketone. Condensation is effected by the addition of 1.35 g. of sodium methylate and heating at reflux for 3 hours. The reaction mixture is cooled, neutralised with glacial acetic acid, excess methyl ethyl ketone is distilled off in water-jet vacuum, the residue is taken up in ether and is washed free of salt with water. After drying the ethereal solution and evaporation of the solvent there remain 84 g. of a crude mixture of 5-hydroxy-6,9-dimethyl-8-decen-3-one and 4-hydroxy-3,5,8-trimethyl-7-nonen-2-one (boiling point 71–75° C./0.025 mm.; $n_D^{20}=1.4654–1.4657$).

This ketol mixture is boiled at reflux for 4 hours with 8.4 g. of phosphoric acid and 280 ml. of benzene and the product of cyclisation so formed is worked up as in Example 1. After a single distillation there are obtained 29 g. of a product, rectification of which leads to an isomer mixture of boiling point 76–78° C./3 mm.; $n_D^{20}=1.4488$, said mixture consisting of 2-(2'-oxobutyl)-3,6,6-trimethyl-tetrahydropyran and 2-(2'-oxo-1'-methyl-propyl)-3,6,6-trimethyl-tetrahydropyran. The product has a pleasing flowery odour reminiscent of lily of the valley.

EXAMPLE 7

70 g. of 2,4,5-trimethyl-4-hexen-1-al and 185 g. of methyl-ethyl-ketone are mixed and treated at 15° C. in the course of 20 minutes with a solution of 1 g. of sodium hydroxide in 10 g. of methanol. The condensation is completed by stirring at room temperature for 3 hours. Working up as described in Example 6 yields 88.6 g. of a crude mixture of 5-hydroxy-6,8,9-trimethyl-8-decen-3-one and 4-hydroxy-3,5,7,8-tetramethyl-7-nonen-2-one, which mixture is cyclised to a mixture of tetrahydrofurans and tetrahydropyrans, which has a woody and tobacco-like odour. The NMR and mass spectrogram data indicate that this mixture contains the following substances:

2-(2'-oxobutyl)-3,5 - dimethyl - 5 - isopropyl - tetrahydrofuran (NMR signal at 1.05 p.p.m.; mass spectrum: m/e=169; 57);

2-(2' - oxo - 1' - methyl - propyl) - 3,5 - dimethyl - 5-isopropyl - tetrahydrofuran (NMR signal at 1.05 p.p.m.; mass spectrum: m/e=169; 43);

2 - (2' - oxobutyl) - 3,5,6,6 - tetramethyl - tetrahydropyran (NMR signal at 1.17 p.p.m.; mass spectrum: m/e=128; 57);

2 - (2' - oxo - 1' - methyl - propyl) - 3,5,6,6 - tetramethyl-tetrahydropyran.

EXAMPLE 8

56 g. of 5-methyl-4-hexen-1-al and 120 g. of acetophenone are dissolved in 200 ml. of dry toluene. A solution of 1.0 g. of sodium hydroxide in 10 g. of methanol is added dropwise with stirring in the course of 30 minutes to the toluene solution which is previously cooled to 0 to −5° C., and the mixture is subsequently stirred for a further 3 hours in the same temperature range. After neutralisation with glacial acetic acid, the toluene is distilled off under reduced pressure and the excess acetophenone is distilled off at about 2 torr. The residue is taken up in ether and washed free of salt with water. After drying the ethereal solution and evaporation of the solvent there are obtained 63 g. of crude 3-hydroxy-1-phenyl-7-methyl-6-octen-1-one.

The cyclisation of 91.5 g. of this crude ketol is effected by means of 9.2 g. of phosphoric acid in 310 ml. of boiling toluene. After fractionation in a spinning-band column there is obtained 2-phenacyl-6,6-dimethyl-tetra-hydropyran of boiling point 140–142° C./1.8 mm.; $n_D^{20}$=1.5196. This compound has a carnation-like odour.

EXAMPLE 9

A mixture of 33.6 g. of 5-methyl-4-hexen-1-al and 147 g. of mesityl oxide is cooled to 0° C. Condensation is initiated by the dropwise addition of a solution of 0.75 g. of sodium hydroxide in 7.5 g. of methanol and completed by stirring at 15° C. for 3 hours. The usual working up yields about 49 g. of crude 6-hydroxy-2,10-dimethyl-2,9-undecadien-4-one which in the I.R.-absorption spectrum shows the strong bands for secondary hydroxyl (3401 and 111 cm.$^{-1}$), conjugated carbonyl (1681 and 1618 cm.$^{-1}$) and a trisubstituted double bond (797 cm.$^{-1}$). This ketol is distillable with partial dehydration; boiling point 100–105° C./0.1 mm.; $n_D^{20}$=1.4876–1.4880.

Upon boiling at reflux for 4 hours in 150 ml. of benzene in the presence of 5 g. of 85% phosphoric acid, the crude ketol yields 12.5 g. of 2-2'-oxo-4'-methyl-3'-pentenyl)-6,6-dimethyl - tetrahydropyran of boiling point 68° C./0.2 mm.; $n_D^{20}$=1.4710–1.4720. (Woody fragrance.)

EXAMPLE 10

In a manner analogous to the foregoing examples, there are obtained the following tetrahydropyrans:

2 - acetonyl - 6 - methyl - 6 - isobutyl - tetrahydropyran; boiling point 81° C./1 mm.; $D_4^{20}$=0.9275; $n_D^{20}$=1.4549; I.R. absorption bands at 1724, 1075, 1047 and 1020 cm.$^{-1}$. (Woody to fruit-like fragrance, reminiscent of bergamot.)

2 - acetonyl - 3,6 - dimethyl - 6 - isobutyl - tetrahydropyran; boiling point 75° C./0.7 mm.; $n_D^{20}$=1.4583; I.R.-absorption bands at 1718, 1094, 1073, 1058 and 1005 cm.$^{-1}$. (Green, fruity fragrance.)

2 - acetonyl - 1 - oxa - spiro[5.5]undecane; boiling point 98° C./1.5 mm.; $D_4^{20}$=0.9978; $n_D^{20}$=1.4800; I.R.-absorption bands at 1718, 1070, 1033 and 1005 cm.$^{-1}$. (Earthy fragrance.)

2 - acetonyl - 3 - methyl - 1 - oxa - spiro[5.5]undecane; boiling point 101° C./1.5 mm.; $n_D^{20}$=1.4848; I.R.-absorption bands at 1718, 1099, 1085, 1064 and 1010 cm.$^{-1}$. (Green, fruity fragrance note.)

2 - acetonyl - 3 - isopropyl - 6,6 - dimethyl - tetrahydropyran; boiling point 94° C./1.5 mm.; $n_D^{20}$=1.4547; I.R.-absorption bands at 1712, 1087, 1050, 1035 and 1002 cm.$^{-1}$. (Green, spicy fragrance note.)

2-acetonyl-3-ethyl-6,6-dimethyl-tetrahydropyran; boiling point 83° C./1.5 mm.; $n_D^{20}$=1.4530; I.R. absorption bands at 1718, 1087, 1070 and 1000 cm.$^{-1}$. (Fresh, mint-like fragrance; woody base note.)

Also, in a manner analogous to that of the foregoing examples, there are obtained the following tetrahydrofurans in admixture with the isomeric tetrahydropyrans:

2-acetonyl-3-ethyl-5-methyl-5-isopropyl-tetrahydrofuran and 2-acetonyl-3 - ethyl-5,6,6-trimethyl-tetrahydropyran; boiling point 92–93° C./2 mm.; $n_D^{20}$=1.4492–1.4650; I.R. absorption bands at 1718, 1094, 1064 and 1008 cm.$^{-1}$. (Green, fatty fragrance note.)

2 - acetonyl-3,3,5-trimethyl-5-isopropyl-tetrahydrofuran and 2-acetonyl-3,3,5,6,6 - pentamethyl - tetrahydropyran; boiling point 91° C./1.5 mm.; $n_D^{20}$=1.4483–1.4546; I.R. absorption spectrum 1718, 1099 and 1066 cm.$^{-1}$. (Cedarwood-like fragrance.)

2-acetonyl-5-methyl-5-isopropyl-tetrahydrofuran and 2-acetonyl-5,6,6-trimethyl-tetrahydropyran; boiling point 54° C./1 mm.; $D_4^{20}$=0.9357; $n_D^{20}$=1.4470–1.4538; I.R. absorption bands at 1718, 1087, 1062 and 1010 cm.$^{-1}$. (Green fragrance note.)

2-acetonyl - 3 - pentyl-5-methyl-5-isopropyl-tetrahydrofuran and 2-acetonyl-3-pentyl-5,6,6-trimethyl-tetrahydropyran; boiling point 131° C./1.5 mm.; $n_D^{20}$=1.4591–1.4628; I.R. absorption bands at 1712 and 1087 cm.$^{-1}$. (Fruity, flowery fragrance.)

2-acetonyl-5-methyl-3,5-diisopropyl-tetrahydrofuran and 2-acetonyl - 3 - isopropyl-5,6,6-trimethyl-tetrahydropyran; boiling point 73–75° C./0.03 mm.; $n_D^{20}$=1.4560–1.4615; I.R. absorption bands at 1712, 1085 and 1070 cm.$^{-1}$. (Spicy, nut-like fragrance.)

2-acetonyl-3,5-dimethyl-3-ethyl-5-isopropyl - tetrahydrofuran and 2-acetonyl-3,5,6,6-tetramethyl-3-ethyl-tetrahydropyran; boiling point 108–110° C./3 mm.; $n_D^{20}$=1.4608–1.4622; I.R.-absorption bands at 1712, 1087 and 1070 cm.$^{-1}$. (Fruit-like fragrance.)

The presence of the tetrahydrofurans and tetrahydropyrans in the above mixtures is, inter alia, indicated by the respective NMR and mass spectrum data.

Whenever the context of the specification and claims so requires or admits, it is intended to include diastereoisomers and mixtures of any compound falling under the general Formulae IV and V.

We claim:
1. A ketone of the formula

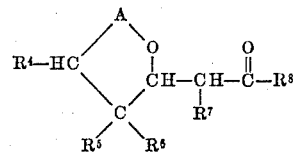

wherein A represents a member selected from the group consisting of

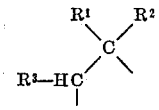

and

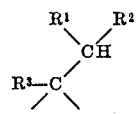

wherein $R^1$ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl, a member selected from the group consisting of phenyl, benzyl and phenethyl, or, together with $R^2$, a lower alkylene group; $R^2$ is a lower alkyl group; $R^3$, $R^4$ and $R^5$ represent hydrogen atoms or lower alkyl groups; $R^6$ represents a hydrogen atom or a lower alkyl or lower alkenyl group; $R^7$ represents a hydrogen atom or a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; and $R^8$ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl or phenyl.

2. A tetrahydropyran ketone of the formula

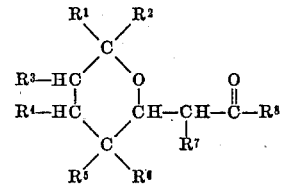

wherein R¹ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl, a member selected from the group consisting of phenyl, benzyl and phenethyl, or together with R², a lower alkylene group; R² is a lower alkyl group, R³, R⁴ and R⁵ represent hydrogen atoms or lower alkyl groups, and R⁶ represents a hydrogen atom or a lower alkyl or lower alkenyl group; R⁷ is a hydrogen atom or a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; and R⁸ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl or phenyl.

3. A tetrahydropyran ketone as claimed in claim 2, wherein R¹, R² and R⁸ are methyl groups and R³, R⁴, R⁵, R⁶ and R⁷ are hydrogen atoms.

4. A tetrahydropyran ketone as claimed in claim 2, wherein R¹, R², R⁵ and R⁸ are methyl groups and R³, R⁴, R⁶ and R⁷ are hydrogen atoms.

5. A tetrahydropyran ketone as claimed in claim 2, wherein R¹, R², R³, R⁵ and R⁸ are methyl groups and R⁴, R⁶ and R⁷ are hydrogen atoms.

6. A tetrahydropyran ketone as claimed in claim 2, wherein R¹, R², R⁵, R⁶ and R⁸ are methyl groups and R³, R⁴ and R⁷ are hydrogen atoms.

7. A tetrahydropyran ketone as claimed in claim 2, wherein R¹, R² and R⁸ are methyl groups, R⁵ is a pentyl group and R³, R⁴, R⁶ and R⁷ are hydrogen atoms.

8. A tetrahydropyran ketone as claimed in claim 2, wherein R¹, R² and R⁵ are methyl groups, R³, R⁴, R⁶ and R⁷ are hydrogen atoms and R⁸ is an ethyl group.

9. A tetrahydropyran ketone as claimed in claim 2, wherein R¹, R², R⁵, R⁷ and R⁸ are methyl groups and R³, R⁴ and R⁶ are hydrogen atoms.

10. A tetrahydropyran ketone as claimed in claim 2, wherein R¹, R², R³ and R⁵ are methyl groups, R⁴, R⁶ and R⁷ are hydrogen atoms and R⁸ is an ethyl group.

11. A tetrahydropyran ketone as claimed in claim 2, wherein R¹, R², R³, R⁵, R⁷ and R⁸ are methyl groups and R⁴ and R⁶ are hydrogen atoms.

12. A tetrahydropyran ketone as claimed in claim 2, wherein R¹ and R² are methyl groups, R³, R⁴, R⁵, R⁶ and R⁷ are hydrogen atoms and R⁸ is a phenyl group.

13. A tetrahydropyran ketone as claimed in claim 2, wherein R¹ and R² are methyl groups, R³, R⁴, R⁵, R⁶ and R⁷ are hydrogen atoms and R⁸ is a 2-methyl-1-propenyl group.

14. A tetrahydropyran ketone as claimed in claim 2, wherein R¹, R², R³ and R⁸ are methyl groups and R⁴, R⁵, R⁶ and R⁷ are hydrogen atoms.

15. A tetrahydropyran ketone as claimed in claim 2, wherein R² and R⁸ are methyl groups, R¹ is an isobutyl group and R³, R⁴, R⁵, R⁶ and R⁷ are hydrogen atoms.

16. A tetrahydropyran ketone as claimed in claim 2, wherein R¹ is an isobutyl group, R², R⁵ and R⁸ are methyl groups, and R³, R⁴, R⁶ and R⁷ are hydrogen atoms.

17. A tetrahydropyran ketone as claimed in claim 2, wherein R¹ and R², taken together, represent a pentamethylene group, R³, R⁴, R⁵, R⁶ and R⁷ are hydrogen atoms and R⁸ is a methyl group.

18. A tetrahydropyran ketone as claimed in claim 2, wherein R¹ and R², taken together, represent a pentamethylene group, R⁵ and R⁸ are methyl groups and R³, R⁴, R⁶ and R⁷ are hydrogen atoms.

19. A tetrahydropyran ketone as claimed in claim 2, wherein R¹, R², R³ and R⁸ are methyl groups, R⁴, R⁶ and R⁷ are hydrogen atoms and R⁵ is a pentyl group.

20. A tetrahydropyran ketone as claimed in claim 2, wherein R¹, R² and R⁸ are methyl groups, R³, R⁴, R⁶ and R⁷ are hydrogen atoms and R⁵ is an isopropyl group.

21. A tetrahydropyran ketone as claimed in claim 2, wherein R¹, R², R³ and R⁸ are methyl groups, R⁴, R⁶ and R⁷ are hydrogen atoms and R⁵ is an isopropyl group.

22. A tetrahydropyran ketone as claimed in claim 2, wherein R¹, R² and R⁸ are methyl groups, R³, R⁴, R⁶ and R⁷ are hydrogen atoms and R⁵ is an ethyl group.

23. A tetrahydropyran ketone as claimed in claim 2, wherein R¹, R², R³ and R⁸ are methyl groups, R⁴, R⁶ and R⁷ are hydrogen atoms and R⁵ is an ethyl group.

24. A tetrahydropyran ketone as claimed in claim 2, wherein R¹, R², R³, R⁵ and R⁸ are methyl groups, R⁶ is an ethyl group and R⁴ and R⁷ are hydrogen atoms.

25. A tetrahydropyran ketone as claimed in claim 2, wherein R¹, R², R³, R⁵, R⁶ and R⁸ are methyl groups and R⁴ and R⁷ are hydrogen atoms, i.e. 2-acetonyl-3,3,5,6,6-pentamethyl-tetrahydropyran.

26. A tetrahydrofuran ketone of the formula

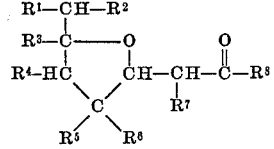

wherein R¹ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl, a member selected from the group consisting of phenyl, benzyl and phenethyl, or together with R², a lower alkylene group; R² is a lower alkyl group; R³, R⁴ and R⁵ represent hydrogen atoms or lower alkyl groups; and R⁶ represents a hydrogen atom or a lower alkyl or lower alkenyl group; R⁷ is a hydrogen atom or a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; and R⁸ represents a lower alkyl group; a hydroxy-lower alkyl group; an acyloxy-lower alkyl group, the acyl residue of which is lower alkanoyl or benzoyl; a lower alkoxy-lower alkyl group having from 1 to 7 carbon atoms in the alkoxy moiety; a phenoxy-lower alkyl group; a lower alkenyl or phenyl.

27. A tetrahydrofuran ketone as claimed in claim 26, wherein R¹, R², R³, R⁵ and R⁸ are methyl groups and R⁴, R⁶ and R⁷ are hydrogen atoms.

28. A tetrahydrofuran ketone as claimed in claim 26, wherein R¹, R², R³ and R⁵ are methyl groups, R⁴, R⁶ and R⁷ are hydrogen atoms and R⁸ is an ethyl group.

29. A tetrahydrofuran ketone as claimed in claim 26, wherein R¹, R², R³, R⁵, R⁷ and R⁸ are methyl groups and R⁴ and R⁶ are hydrogen atoms.

30. A tetrahydrofuran ketone as claimed in claim 26, wherein R¹, R², R³ and R⁸ are methyl groups and R⁴, R⁵, R⁶ and R⁷ are hydrogen atoms.

31. A tetrahydrofuran ketone as claimed in claim 26, wherein R¹, R², R³ and R⁸ are methyl groups, R⁵ is a pentyl group and R⁴, R⁶ and R⁷ are hydrogen atoms.

32. A tetrahydrofuran ketone as claimed in claim 26, wherein R¹, R², R³ and R⁸ are methyl groups, R⁵ is an ethyl group and R⁴, R⁶ and R⁷ are hydrogen atoms.

33. A tetrahydrofuran ketone is claimed in claim 26, wherein $R^1$, $R^2$, $R^3$, $R^5$, $R^6$ and $R^8$ are methyl groups and $R^4$ and $R^7$ are hydrogen atoms.

34. A tetrahydrofuran ketone as claimed in claim 26, wherein $R^1$, $R^2$, $R^3$ and $R^8$ are methyl groups, $R^5$ is an isopropyl group and $R^4$, $R^6$ and $R^7$ are hydrogen atoms.

35. A tetrahydrofuran ketone as claimed in claim 26, wherein $R^1$, $R^2$, $R^3$, $R^5$ and $R^8$ are methyl groups, $R^6$ is an ethyl group and $R^4$ and $R^7$ are hydrogen atoms.

References Cited

UNITED STATES PATENTS 3,032,558   5/1962   Montagna et al. ____ 260—345.7
3,206,479   9/1965   Sax _____ 260—345.7 XR

OTHER REFERENCES

Fieser and Fieser, "Advanced Organic Chemistry," Reinhold Pub. Corp., New York (1961), pp. 456–9.

Houben-Weyl, "Methoden de Organischen Chemie," vol. 6, No. 4, Georg Thieme Verlag, Stuttgart (1966), pp. 18–21.

HENRY R. JILES, Primary Examiner

JOHN M. FORD, Assistant Examiner

U.S. Cl. X.R.

252—522; 260—345.9, 347.4, 347.8, 476, 488, 592, 594, 599, 602, 603